Oct. 21, 1958  C. E. LEJA  2,856,982
RESILIENT SUPPORTS
Filed April 10, 1957
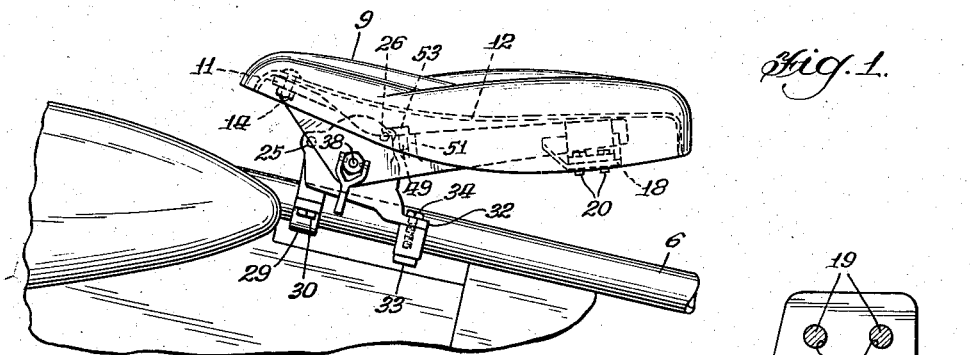
Fig. 1.
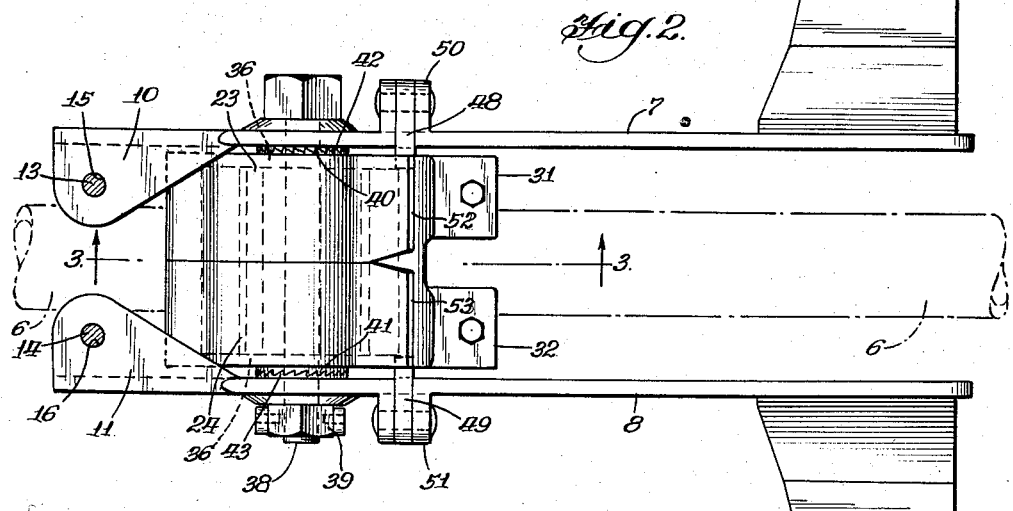
Fig. 2.
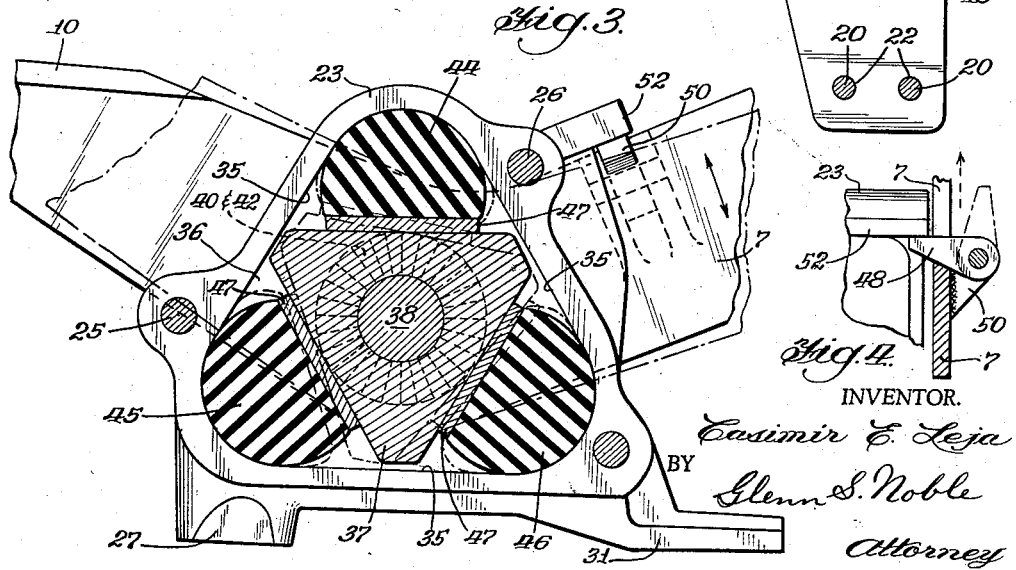
Fig. 3.
Fig. 4.
INVENTOR.
Casimir E. Leja
BY
Glenn S. Noble
Attorney United States Patent Office 2,856,982
Patented Oct. 21, 1958

2,856,982
RESILIENT SUPPORTS
Casimir E. Leja, Chicago, Ill.
Application April 10, 1957, Serial No. 651,987
3 Claims. (Cl. 155—5.17)

My improved device is applicable for various purposes, but is particularly useful in connection with vehicles such as tractors, or the like, and is intended for supporting motorcycle seats and will be described in this connection. It includes the use of elastic cushioning elements interposed between two relatively rotatable members, the cushioning elements serving to resist such rotation. One of said elements may be embodied in a supporting casing which surrounds a substantially concentric rotatably yielding member mounted therein and cushioning or resilient elements are interposed between the outer and inner members which tend to hold the inner member in normal position.

When my improved seat support is used on a motorcycle, it provides a more ideal support for the rider as distinguished from such seats heretofore used having spring means to provide the resiliency. Furthermore, my improved resilient support is much more comfortable for the rider and does not have such reaction forces as common in the present seat supports for such vehicles.

Other advantages will be disclosed in the following description taken in connection with the accompanying drawings in which, Fig. 1 is a side view showing a fragmentary part of a motorcycle frame with a seat mounted on my improved support;

Fig. 2 is a plan view of the supporting mechanism with the seat removed;

Fig. 3 is a sectional view taken substantially on the line 3—3 of Fig. 2; and

Fig. 4 is a detail of one of the stops or catches for holding the seat in adjusted position.

As shown in these drawings, 6 represents the top frame member or tube of any regular or special motorcycle. My support includes two frame members 7 and 8 to which the seat 9 is attached. These members have front lugs or brackets 10 and 11 to which the seat plate 12 is attached as by means of bolts 13 and 14 which extend through holes 15 and 16 in the brackets. The rear ends of the frame members are also provided with outwardly extending brackets 17 and 18. The rear portion of the seat member 12 is secured to these brackets by means of the bolts 19 and 20 which extend through holes 21 and 22 in the brackets as shown particularly in Fig. 1.

Two housing members 23 and 24 are mounted adjacent to the front end of the frame. These members are of generally triangular shape in cross section and are secured together by means of bolts or cap screws 25 and 26 so that they form a substantially integral casing. These housing members have downwardly extending lugs 27 and 28 which are connected by straps 29 and bolts 30 with the frame member 6. The housing members also have rearwardly extending projections 31 and 32 which are fastened to the frame member 6 by a strap 33 and bolts or screws 34.

As will be seen from the drawings, the housing members provide a substantially triangular housing or supporting member which may have as many sides as desired, but in the present instance, it is provided with three flat walls or faces 35 and with ends 36. A relatively rotatable triangular member 37 is mounted concentrically in the casing, the several members being held together by a bolt 38 which extends out through the side members 7 and 8 and is provided with a locking nut 39.

Each end of the triangular member 37 is provided with a circular ratchet or teeth 40, 41 which coact with corresponding ratchet members 42 and 43 on the inner faces of the frame members 7 and 8 for adjusting the tension of the seat as will presently be explained.

Short resilient compression members 44, 45 and 46 are interposed between the faces of the triangular center member and the corners of the casing as best shown in Fig. 3. These compression members may be formed of rubber, synthetic rubber, or other suitable elastic material and fit snugly within the spaces provided. Each of the elastic members is provided with a plate or lining 47 for engagement with the faces of the central triangular member. The metallic plates or lining members 47 are preferably bonded to the compression members during the manufacture of the same. The central member is preferably made of steel and normally there would be an excess of friction between the faces of this member and the rubber resilient members which coact therewith. The plates 47 may be made of any suitable material to overcome such friction and to permit the more or less sliding action between the several members during the operation of the devices. I have found that bronze plates vulcanized to the rubber members form a satisfactory contact for this purpose.

As indicated in Fig. 3, it will be seen that when the seat 9 is actuated, it tends to swing down on the bolt 38 and to compress the resilient members surrounding the triangular central member. This compression provides excellent support for the seat and increases the riding pleasure. In order to prevent the seat from swinging up beyond a predetermined distance and in order to give a predetermined amount of tension, I provide dogs 48 and 49 which are pivoted to the lugs 50 and 51 on the frame members 7 and 8 and project inwardly to engage with stops 52 and 53 on the casing members 23 and 24 as shown in Fig. 2. When the tension is to be adjusted, the rear part of the seat is pressed downwardly until these dogs are below the lugs when they are swung in so that they will engage the lugs and hold the side pieces in such adjusted positions. The bolt 38 is loosened so that the ratchets on the arms may move relatively to the ratchets on the center member until the desired tension is obtained.

From this description, it will be seen that I have provided a resilient support which I have found in actual use to be more comfortable and satisfactory than other motor cycle seats heretofore produced.

What I claim is:

1. A resilient support for seats or the like, including a casing to be held in fixed position, a multiple-sided member rotatably mounted in the casing, compression members between the walls of the casing and said rotatable member for resisting the turning movement of the rotatable member and friction reducing metallic plates attached to the respective compression members and engaging the walls of the rotatable member which tend to prevent rotation of the compression members.

2. A resilient support for supporting seats or the like, including a substantially triangular casing having side and end walls, means for attaching the casing to a motorcycle frame, a triangular compression member rotatably mounted in the casing, means for adjusting the angular position of the compression member with respect to the casing, means for attaching a seat to the compression member, resilient compression pieces interposed between the triangular member and the inner corners of the casing, the apexes of the triangular member extending substantially out to the walls of the casing, anti-friction inserts between the triangular member and the compression members, the arrangement being such that when the triangular member is turned, it will tend to compress the compression members without rotating in the casing, and means for adjusting the position of the seat with respect to the casing to regulate the tension on the seat.

3. In a resilient support, the combination of an outer casing, an inner compression member coaxially mounted in the casing for limited rotation relative thereto, a plurality of pads of resilient cushioning material positioned between the casing and the inner member which normally tend to resist the turning of the inner member with respect to the casing, non-friction plates secured to the inner faces of the pads and engaging with the sides of the compression member, means for securing the casing to a supporting member, frame arms secured to the compression member, ratchet connections between the frame arms and the compression member, and means for holding the arms in adjusted positions with respect to the casing.

References Cited in the file of this patent

UNITED STATES PATENTS

| | | |
|---|---|---|
| 2,570,970 | Murray | Oct. 9, 1951 |
| 2,729,442 | Neidhart | Jan. 3, 1956 |

FOREIGN PATENTS

| | | |
|---|---|---|
| 84,254 | Sweden | Sept. 3, 1935 |